United States Patent [19]
Guenin

[11] Patent Number: 5,630,748
[45] Date of Patent: May 20, 1997

[54] MACHINING METHOD AND APPARATUS

[75] Inventor: Maurice Guenin, La Chaux-de-Fonds, Switzerland

[73] Assignee: Voumard Machines Co., S.A., La Chaux-de-Fonds/NE, Switzerland

[21] Appl. No.: 283,742

[22] Filed: Aug. 1, 1994

[30] Foreign Application Priority Data

Sep. 6, 1993 [EP] European Pat. Off. ............... 9381063

[51] Int. Cl.$^6$ ........................................... B24B 5/02
[52] U.S. Cl. ................ 451/152; 451/134; 451/14; 451/149
[58] Field of Search .................. 451/65, 124, 132, 451/134, 150, 152, 154, 19, 14, 15, 12, 143, 149

[56] References Cited

U.S. PATENT DOCUMENTS

| | | | |
|---|---|---|---|
| 2,452,989 | 11/1948 | Brown | 451/239 |
| 3,057,120 | 10/1962 | Yingst | 451/239 |
| 5,179,806 | 1/1993 | Brown et al. | 451/134 |

FOREIGN PATENT DOCUMENTS

| | | |
|---|---|---|
| 0512956A1 | 11/1992 | European Pat. Off. . |
| 1129935 | 1/1957 | France . |
| 60-31621 | 7/1985 | Japan . |
| 62-100847 | 6/1987 | Japan . |
| 1-301038 | 12/1989 | Japan . |
| 2-109673 | 4/1990 | Japan . |
| 2-224970 | 9/1990 | Japan . |
| 4-42336 | 4/1992 | Japan . |
| 0102414 | 12/1916 | United Kingdom ............ 451/15 |

OTHER PUBLICATIONS

Patent Abstracts of Japan, vol. 14, No. 91, Feb. 20, 1990.

*Primary Examiner*—Robert A. Rose
*Attorney, Agent, or Firm*—Oliff & Berridge

[57] ABSTRACT

The apparatus, especially a grinding machine, comprises a frame (14) on which two working planes (A, B) are used, at least two oscillating elements (11, 12) disposed on one of the planes and each including at least one tool device (15, 16), at least one further tool device disposed on the other plane, and at least one means for generating oscillating motion (20) whereby a reciprocating movement can be generated at the level of each of the oscillating elements, so that the resultant of the vectors representing the dynamic forces associated with the movement of each of the oscillating elements is substantially equal to zero. There is then little or no induced vibration.

14 Claims, 7 Drawing Sheets

MACHINING METHOD AND APPARATUS

This invention relates to machining equipment, and more particularly to machining apparatus of the type having a frame on which at least two working planes including substantially orthogonal displacement axes are used, at least two oscillating elements disposed movably on one of the working planes and driven by at least one servomotor, at least one tool device being disposed on the other working plane, and at least one means for generating oscillating motion. The invention further relates to a machining method utilizing such apparatus, intended especially for use as a grinding machine.

Machining operations can be carried out with prior art grinding machines with a single or multiple oscillating shaft. Such grinding machines, however, with a conventional configuration of shafts in which the oscillating elements move simultaneously on both sides, encounter problems, frequently major ones, of vibration, extraneous oscillations, unstable behavior, etc. This compels the designer to limit the working speed of the tool, thus contributing toward a reduction of output and an increase in production costs. In order to manufacture a grinding machine with higher output, it would be necessary to provide for a very efficient vibration-damping system, hence a machine having an extremely heavy, sturdy frame, since the dynamic forces entering into consideration at the time of a movement of oscillation are very great and difficult to damp.

A grinding machine of the kind specified at the beginning, having balanced oscillating motion, is described in Vol. 14, No. 91, of Patent Abstracts of Japan, (M-938) (4034), of 20 Feb. 1990 and Japanese Laid-Open Application No. 1,301,038.

It is an object of this invention to provide an improved machining apparatus and method in which the kinetic forces due to the movement of the movable elements are eliminated at the source by cancelling each other out.

A further object of this invention is to provide machining apparatus, especially a grinding machine, using at least two tool devices oscillating symmetrically in opposite directions on a shaft, linearly or angularly, whereby profiles may be obtained, e.g., when a rotary workpiece holder is used, by dynamic interpolation between the movements of two axes, thus determining the relative movements necessary between the workpiece and the cutting tool.

To this end, in the machining apparatus according to the present invention, of the type initially mentioned, each of the oscillating elements includes at least one tool device, and the means for generating oscillating motion permits the generation of a reciprocating movement of each of the oscillating elements so that the resultant of the vectors representing the dynamic forces associated with the movement of each of the oscillating elements is substantially equal to a value of zero.

In the method according to the present invention, utilizing the foregoing machining apparatus, the assemblies formed by the oscillating elements and the tool devices move according to trajectories and speeds permitting the mutual cancellation of the kinetic forces connected with the movement of each of these assemblies.

The mutual cancellation of the dynamic forces at the source makes it possible to obtain advantageous performances as compared with conventional axis configurations.

The inventive machining apparatus, permitting the damping of the dynamic forces at the source, makes it possible to machine or grind certain profiles at a very high speed of rotation of the part and frequency of oscillation of the machining elements (which may exceed 10 c/s) and with very great precision. Even at high speed, vibration is minimal or non-existent. It is therefore possible to obtain very high-precision profiles with most advantageous machining times and costs. The reduction of forces likewise brings about a substantial improvement of rigidity to the driving elements, as well as a decrease in torque made possible by the reduction of the initial load at the thrust bearings. Moreover, the production mode in which the tool devices oscillate in opposite directions allows the use of a first oscillating tool for the blank grinding and a second one for the finish grinding.

Preferred embodiments of the invention will now be described in detail with reference to the accompanying drawings, in which:

FIG. 8b is an elevation of the modification of FIG. 8a; and

Figure 1:
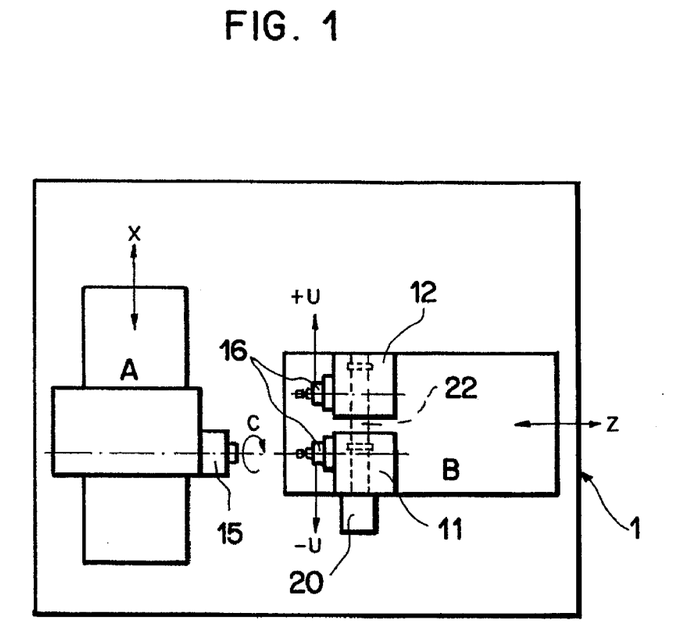
FIG. 1 is a diagrammatic top plan view of machining apparatus on a grinding machine according to the present invention.
Figure 2:
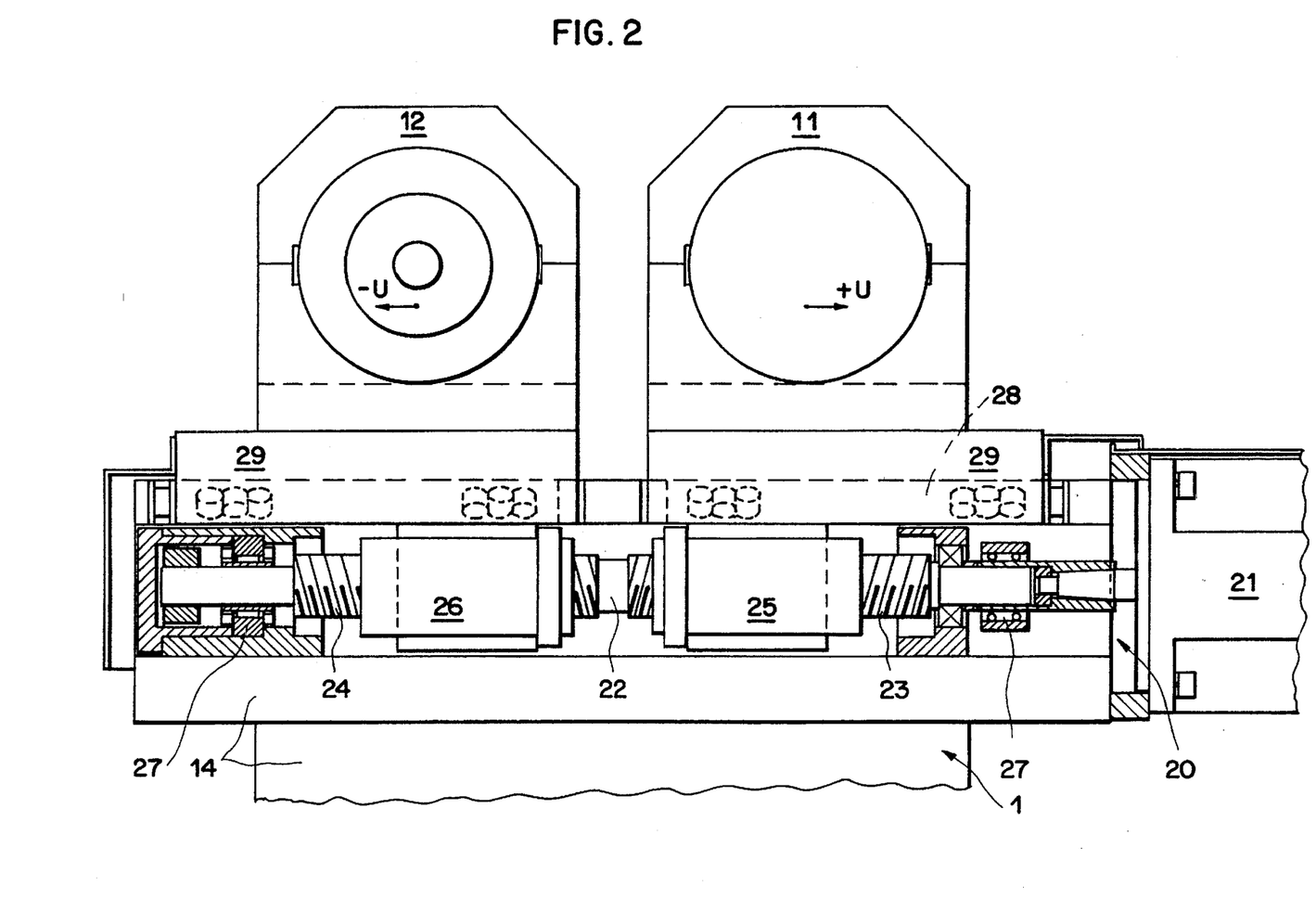
FIG. 2 is an elevational section through machining apparatus in a first embodiment of the invention.
Figure 3:
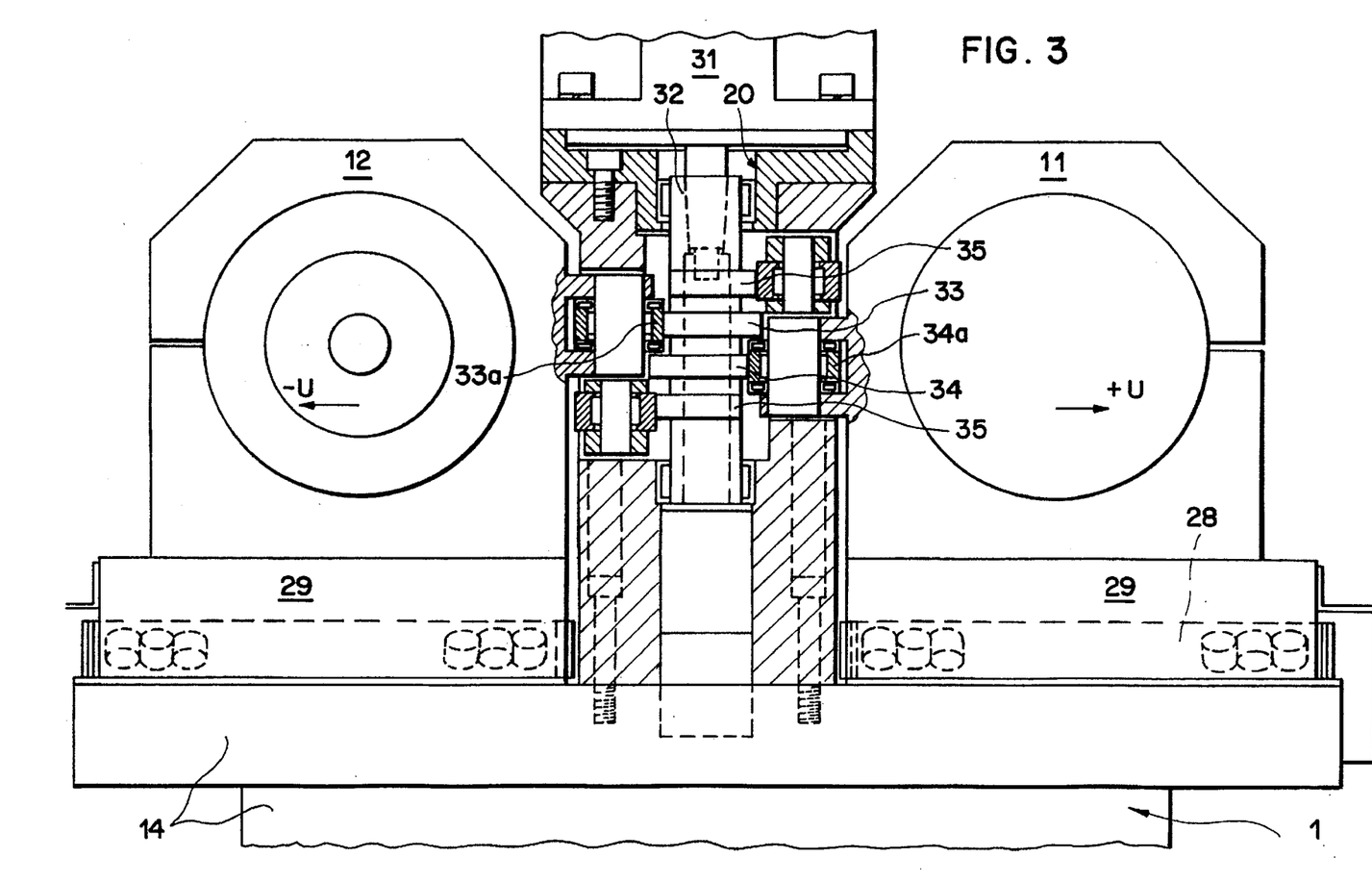
FIG. 3 is an elevational section through machining apparatus in a second embodiment of the invention.
Figure 4:
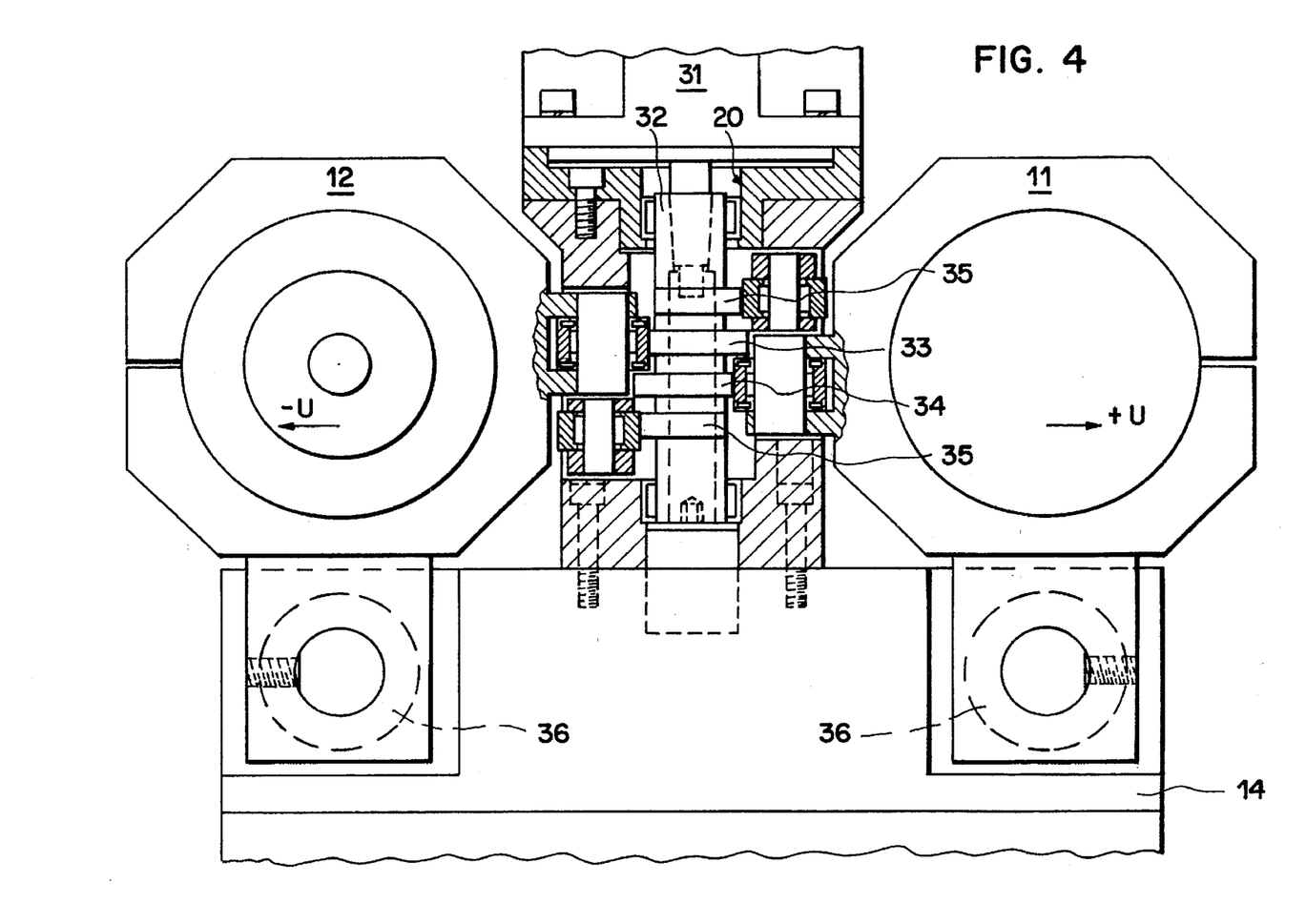
FIG. 4 is an elevational section through machining apparatus in a third embodiment of the invention.

The inventive machining apparatus includes means 20 for generating oscillating motion. FIGS. 2, 3, and 4 show three different designs of means 20 in respective embodiments of the invention. FIG. 1, as well as FIGS. 5–8, illustrate various possible modifications of the inventive machining apparatus. Each of these modifications comprises a means 20 for generating oscillating motion corresponding preferentially to one or the other of the three embodiments to be described below.

FIG. 1 gives an overall view of the machining apparatus, showing a first variant of a grinding machine according to the present invention. Like prior art grinding machines, this one comprises a first working plane A containing at least one axis of rotation C, generally corresponding to the axis of rotation of the workpiece holder, this same workpiece holder being capable of moving laterally along an axis X. A second working plane B, in juxtaposition with plane A, on which the working tools are preferably disposed, comprises a longitudinal displacement axis Z, preferably substantially orthogonal to displacement axis X of plane A. The presence of working axes X and Z permits the interaction between the tools and the workpiece, just as on prior art grinding machines. In a modification, axis X might also be situated over or under axis Z. Oscillating elements 11 and 12, disposed side by side in working plane B, and on which grinding spindles 16 are disposed, move laterally along an axis U. A workpiece-holding headstock 15 having an axis of rotation C is disposed in plane A substantially parallel to displacement axis Z of plane B.

Such a configuration permits workpieces of a particular profile to be machined owing to a dynamic interpolation between the movements of the two machining axes (U and C), thus determining the necessary relative movements between the workpiece to be machined and the cutting tool. On a prior art grinding machine, oscillating elements 11 and 12 move simultaneously in the direction +U, then in the direction −U, alternately, generating a reciprocating motion. The imbalance caused by such a movement is quite considerable and entails numerous drawbacks, as stated earlier. In order to minimize the vibration, the inventive apparatus is designed so that the oscillating elements move along trajectories and at speeds permitting the kinetic forces connected with the movement of each of these elements to be mutually cancelled out. The mass of these elements must then be substantially equivalent.

In order better to illustrate how these movements are brought about, FIG. 2 shows a grinding machine 1 in a first embodiment of the invention. Grinder 1 comprises a means 20 for generating oscillating motion consisting of a servomotor 21, preferably electric, disposed against the frame 14 of grinder 1 and driving a transmission screw 22, preferably a ball screw. Screw 22 is preferably disposed under oscillating elements 11 and 12, in frame 14 of machine 1, and is held at each end by a thrust bearing 27. Screw 22 includes two portions, with a right-hand thread 23 cut on one and a left-hand thread 24 cut on the other, the threads of the two screw portions preferably being identical. A right-hand tapped nut 25 and a left-hand tapped nut 26 are disposed on the respective portions 23 and 24 of screw 22 so as to move in opposite directions when the latter is rotated. Oscillating elements 11, 12 are disposed side by side: a first oscillating element 11 is disposed on a slide 29 capable of moving on a linear guide means 28; a second oscillating element 12 is disposed on another slide 29, likewise capable of moving on the same linear guide means 28. The first nut 25 is connected to the first workpiece-holder slide assembly 29/11, the second nut 26 being connected to the second workpiece-holder slide assembly 29/12.

When servomotor 21 drives transmission screw 22 rotatingly, nuts 25 and 26 move in opposite directions: first away from one another, then toward one another. The result is the reciprocating movement of elements 11 and 12, which move away from one another (element 11 going along axis +U, element 12 along axis −U), then toward one another, according to the direction of rotation of transmission screw 22. Servomotor 21 therefore guides the oscillating motion by turning alternately in one direction, then the other.

The various parameters, such as the distance traveled by nuts 25, 26 on each side of screw 22, the pitch of screw 22, the speed of rotation, etc., are determined in terms of the type of machine, the mass of the rotating and oscillating components, the type of operation to be carried out, etc. All the parameters are selected in such a way as to obtain a dynamic equilibrium of the whole. Thus, each moving component may be associated with a vector representing the dynamic forces connected with the movement of that component. The inventive apparatus is configured in such a way that the resultant of these vectors tends toward a value of zero, i.e., it is substantially equal to a value of zero. The vibration occurring during operation is thus minimized and may even be imperceptible to the eye and/or to the touch.

In practice, this amounts to providing, for example, that the at least two movable assemblies, viz., components 24, 26, 29, 12, on the one hand, and components 23, 25, 29, 11, on the other hand, be substantially symmetrical and balanced so that the forces generated during the oscillating movement will cancel each other out. The forces developing at the level of screw 22, linear guide means 28, and frame 14 are thus virtually nil. Furthermore, through the known relation F=ma, a dynamic symmetry may be provided where the different elements of mass m1, m2, etc., in movement, have different masses and/or accelerations a1, a2, etc., the resultant dynamic force F tending as greatly as possible toward a value of zero.

FIG. 3 presents a second embodiment of the invention, in which means 20 for generating oscillating motion comprises a cam assembly rather than a transmission screw with reversed threads. The oscillating elements are advantageously disposed as explained above, owing to linear guide means 28 and slides 29. A camshaft 32 oriented along a substantially vertical axis, preferably disposed in the plane median to the two moving parts, is driven rotatingly by a servomotor 31 preferably disposed at the top of camshaft 32 and fixed to frame 14. Camshaft 32 drives a left-hand cam 33 co-operating with a left-hand thrust bearing 33a connected to oscillating element 12, as well as a right-hand cam 34 co-operating with a right-hand thrust bearing 34a connected to oscillating element 11. The prolongations of cams 33 and 34 are oriented opposite to one another. By the action of the rotation of shaft 32, cams 34 and 33 act simultaneously to push oscillating elements 11 and 12 back along axis +U and axis −U, respectively. As the rotation of shaft 32 progresses, cams 33 and 34 push oscillating elements 11 and 12 toward their end positions in which they are farthest apart, then these elements can move closer to one another, e.g., when acted upon by a retractile spring (not shown) disposed between elements 11 and 12. One or more preloading cams 35 may be provided for eliminating play between the parts.

FIG. 4 presents a third embodiment of the invention, in which means 20 for generating oscillating motion is similar to that shown in FIG. 3, except that instead of oscillating elements 11 and 12 being supported by linear guide means 28 and slides 29, they are supported by bearings 36 fixed to frame 14. Elements 11 and 12 are disposed on bearings 36 so as to be able to pivot angularly along axis +U or −U and are thus advantageously oriented so that their respective axes are substantially parallel to axis C (FIG. 1).

Several modifications and embodiments will be described below. Those elements which are of the same nature and play the same parts as the corresponding elements already described bear the same reference numerals.

Regardless of the form of means 20 for generating oscillating motion, at least one tool device, preferably either a workpiece-holding headstock 15 or a grinding spindle 16, is disposed on each of the oscillating elements 11 and 12. FIG. 1 illustrates a design in which oscillating elements 11 and 12, disposed in plane B, are equipped with grinding spindles 16 which may use a multitude of cutting tools, such as a grinding wheel, a milling cutter, or a chisel. This variant comprises a workpiece-holding headstock 15 of a type known per se, disposed in plane A. According to such a configuration, oscillating element 11 might be used primarily for machining a blank, element 12 then being used for the finishing. It suffices for the headstock to be able to move along axis X, perpendicular to axis of rotation C, and for elements 11 and 12 to be able to move forward or back along axis Z, in order to carry out all desired operations. In another modification (not shown), a second workpiece-holding headstock 15 is disposed parallel to the first one on plane A, e.g., facing the grinding spindle 16 disposed on oscillating element 12. Thus two workpieces may be worked simultaneously or successively.

The grinding machine according to the present invention provides for various modifications, in which the locations of the workpiece-holding headstocks and the grinding spindles may be reversed. A great number of possibilities of use are thus obtained, some of which are set forth below.

Figure 5:
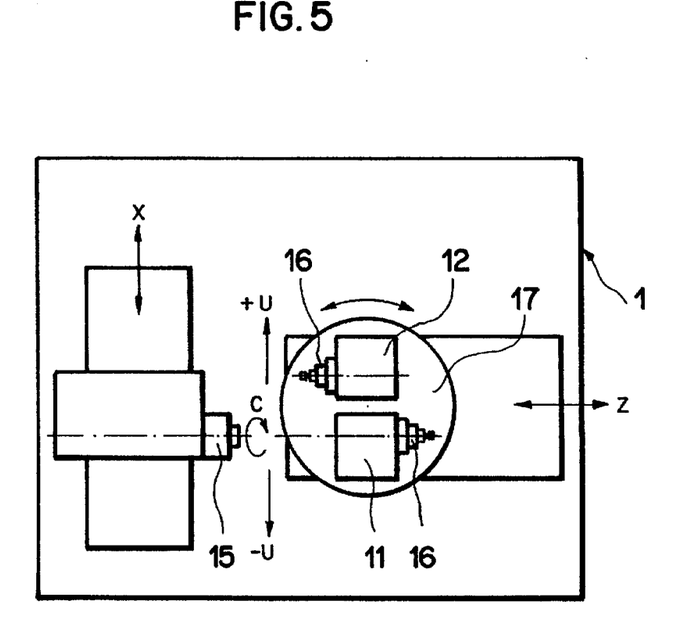
FIG. 5 is a diagrammatic top plan view of the inventive machining apparatus in a modification comprising two opposite spindles (side by side) disposed on a turret.

According to a further modification, illustrated in FIG. 5, oscillating elements 11 and 12 are disposed side by side on a turret 17, grinding spindles 16 being oriented in opposite directions to one another, the active spindle being caused to face the workpiece by indexing the turret. It should be noted that the symmetry of the various elements is respected, the forces cancelling each other out.

Figure 6:
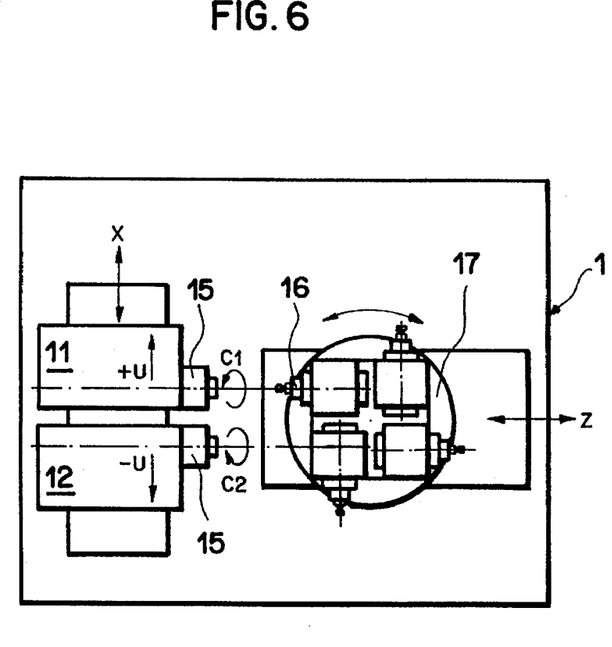
FIG. 6 is a diagrammatic top plan view of the inventive machining apparatus in a further modification where four spindles are disposed on a turret, and two workpiece-holding headstocks are disposed on the oscillating elements.

FIG. 6 illustrates a modification in which the workpiece-holding headstocks 15 are disposed on oscillating elements 11 and 12. Several grinding spindles 16, revolvingly disposed on a turret 17, complete the assembly, the active spindle being caused to face the workpiece by indexing the turret. By means of the various movements along axes X, Z,, and C, as mentioned above, the desired operations may be carried out. It will be understood that a grinding machine according to this modification may comprise a single grinding spindle or else two spindles disposed side by side, thus avoiding the use of turret 17.

Figure 7:
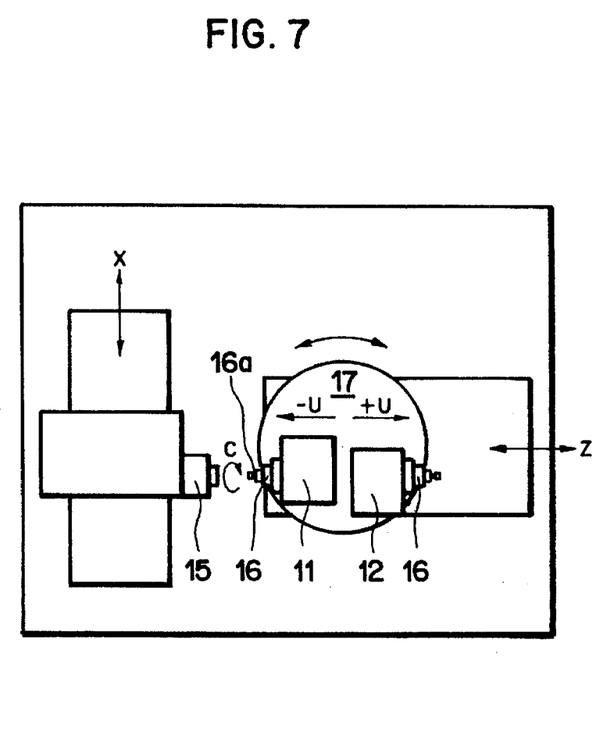
FIG. 7 is a diagrammatic top plan view of the inventive machining apparatus in another modification comprising two opposite spindles (back to back) disposed on a turret, the oscillating movement being parallel to the axis of rotation of the workpiece.

FIG. 7 illustrates a modification in which oscillating elements 11 and 12 are disposed back to back, the oscillating motion being oriented substantially parallel to axis of rotation C. This modification is advantageous, for instance, when machining workpieces where an oscillatory motion substantially parallel to axis of rotation C is desirable, e.g., certain tubular workpieces.

Figure 8A:
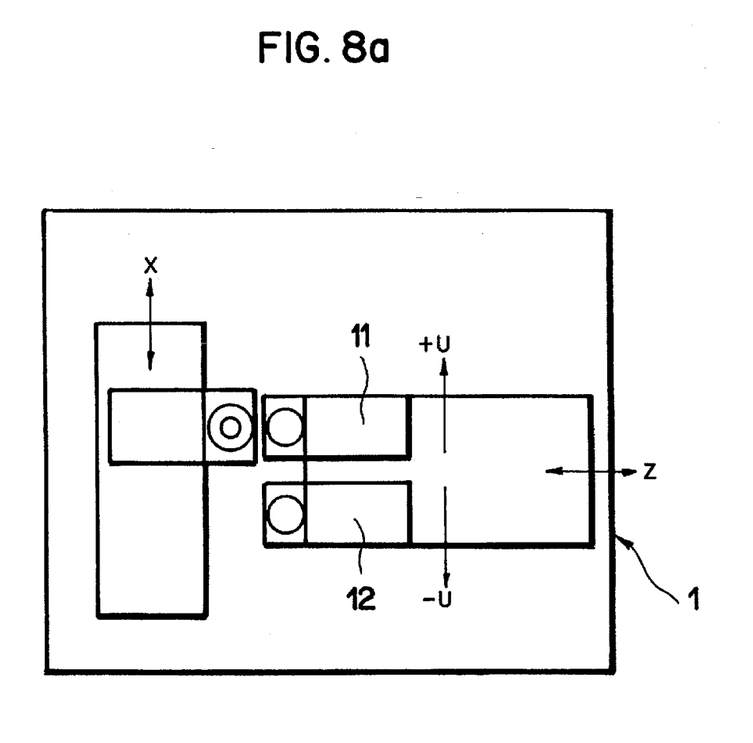
FIG. 8a is a diagrammatic top plan view of the inventive machining apparatus in another modification comprising two opposite spindles (side by side) disposed on a turret, the axes of rotation of the workpiece and of the tool being vertical.
Figure 8B:
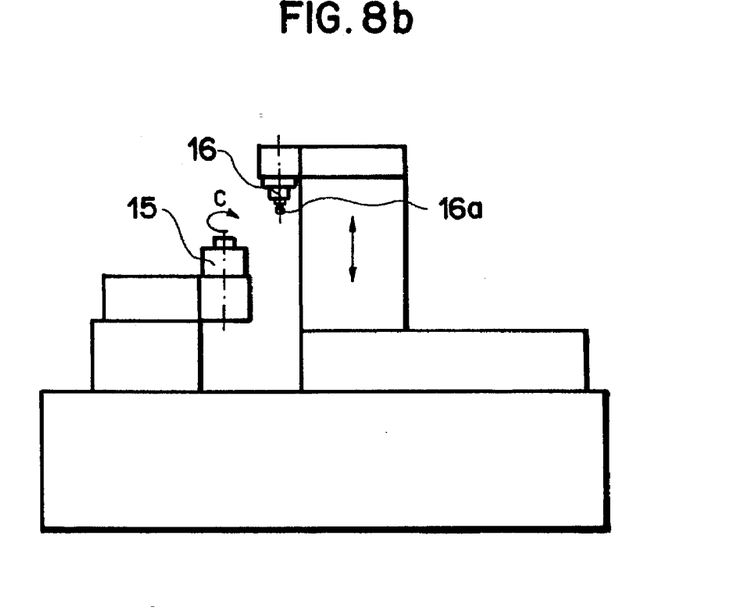

FIG. 8 shows a modification in which the two axes of rotation are vertical. This means that the axis of oscillation must be situated above or below axis of rotation C.

Figure 9:
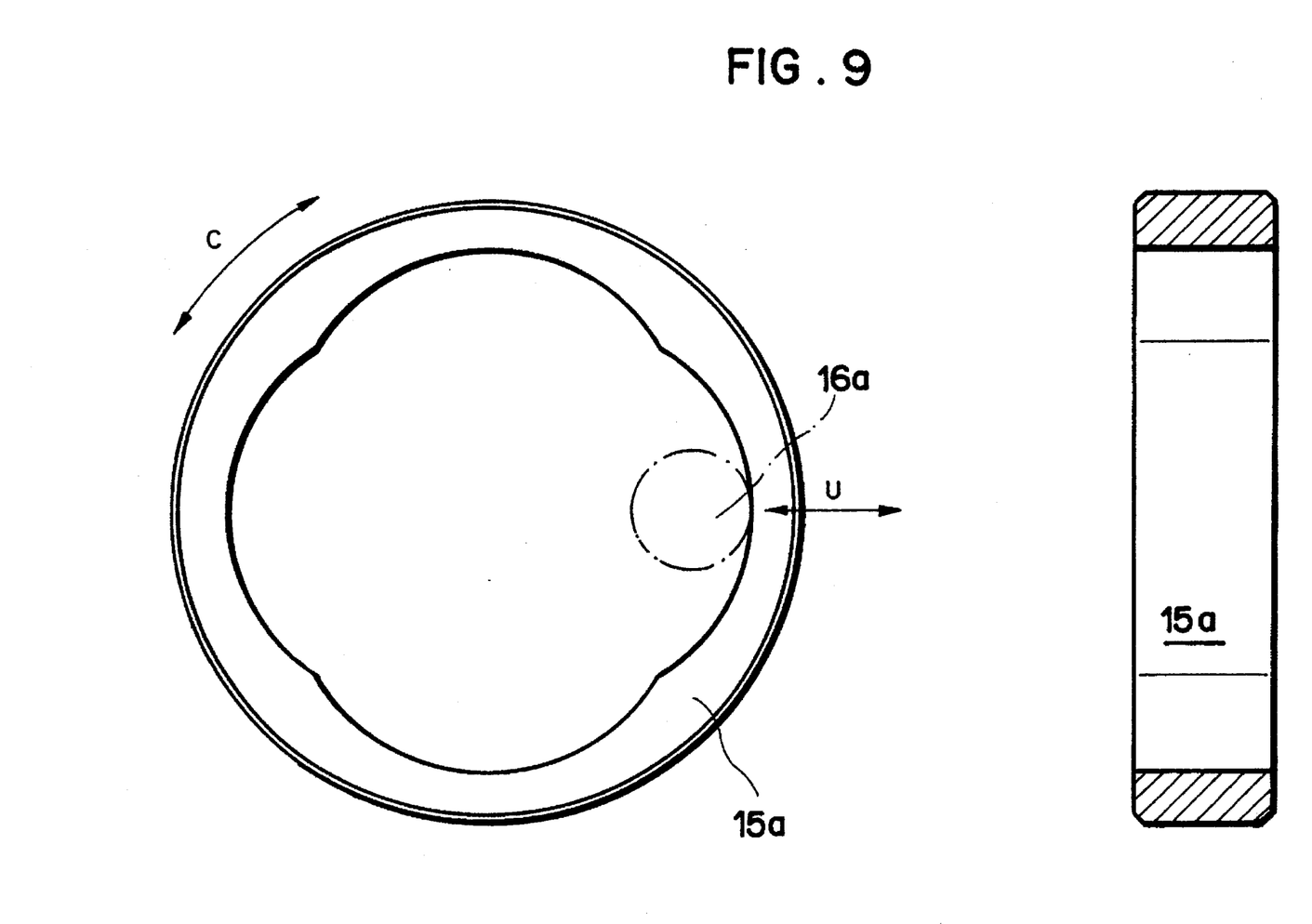
FIG. 9 is a diagrammatic illustration of a workpiece having an internal profile formed by a tool on machining apparatus according to the present invention.

FIG. 9 illustrates an example of a workpiece which can be machined thanks to the inventive method and apparatus. It may be a question of cam profiles, for example, especially for injection pumps, or of polygonal profiles, used for fixing gears on transmission shafts, for example, and so on.

According to the present invention, the number of oscillating elements 11 and/or 12, as well as the number of tool devices 15 and/or 16, is not limited, although a large number of such elements may complicate the operating dynamics, and hence the configuration of the machine.

It will therefore be understood that the inventive apparatus may take innumerable forms. Thus, the respective positions of spindles 16 and workpiece-holding headstocks 15 may be inverted, whereby the rotary and oscillatory motions may be combined or separated. Moreover, in case several spindles and/or several headstocks are provided on machining apparatus, it is not indispensable that all the elements being used should carry out a machining operation simultaneously. For instance, one oscillating tool may serve merely as a counterbalance while another oscillating tool is machining a workpiece.

What is claimed is:

1. A grinding machine comprising a frame containing at least two working planes including substantially orthogonal displacement axes, at least two oscillating elements disposed movably on one of said working planes, at least one tool device disposed on the other of said working planes, at least one servomotor for driving said oscillating elements, at least one means for generating oscillating motion, at least one further tool device associated with each of said oscillating elements, and means for generating a reciprocating movement of each of said oscillating elements, forming part of said at least one means for generating oscillating motion, the resultant of the vectors representing the dynamic forces associated with the movement of each of said oscillating elements being substantially equal to zero.

2. The grinding machine of claim 1, wherein said one tool device is a workpiece-holding headstock, and said further tool device is a spindle.

3. The grinding machine of claim 1, wherein said one tool device is a spindle and said further tool device is a workpiece-holding headstock.

4. The grinding machine of claim 2, wherein said spindle is a grinding spindle.

5. The grinding machine of claim 3, wherein said spindle is a grinding spindle.

6. The grinding machine of claim 1, wherein said oscillating elements are disposed on a turret.

7. The grinding machine of claim 1, wherein said oscillating elements are disposed side by side.

8. The grinding machine of claim 1, wherein said oscillating elements are disposed back to back.

9. The grinding machine of claim 1 comprising a single said servomotor.

10. The grinding machine of claim 1, wherein said oscillating elements have substantially identical masses.

11. The grinding machine of claim 1, wherein said means for generating oscillating motion comprises a transmission screw driven by said servomotor and having two portions, one of said portions being cut with a right-hand thread and the other of said portions being cut with a left-hand thread, a right-hand tapped first nut and a left-hand tapped second nut being disposed on the respective said portions, said first nut being connected to a first one of said oscillating elements, and said second nut being connected to a second one of said oscillating elements.

12. The grinding machine of claim 11, further comprising a linear guide means and two slides capable of moving on said linear guide means, said first one of said oscillating elements being disposed on one of said slides and said second one of said oscillating elements being disposed on the other of said slides.

13. The grinding machine of claim 1, wherein said means for generating oscillating motion comprises a camshaft oriented along a substantially vertical axis contained in a plane median to said two oscillating elements and driven rotatingly by said servomotor, a left-hand thrust bearing connected to one of said oscillating elements, a right-hand thrust bearing connected to the other of said oscillating elements, a left-hand cam driven by said camshaft and co-operating with said left-hand thrust bearing, a right-hand cam driven by said camshaft and co-operating with said right-hand thrust bearing, the prolongations of said cams being oriented substantially opposite to one another, and a retractile spring disposed between said oscillating elements.

14. The grinding machine of claim 13, wherein said means for generating oscillating motion further comprises at least two bearings fixed to said frame, said oscillating elements being respectively disposed on said bearings for angular pivoting in opposite directions.

* * * * *